US011949319B2

(12) United States Patent
Devaraj et al.

(10) Patent No.: US 11,949,319 B2
(45) Date of Patent: Apr. 2, 2024

(54) MULTI-SPEED GEARBOX AND THE DRIVE AXLE MADE THEREWITH

(71) Applicant: Dana Automotive Systems Group, LLC, Maumee, OH (US)

(72) Inventors: Gowrisankar Devaraj, Ghent (BE); Eric M. Engerman, Plymouth, MI (US); Charles B. Lohr, III, Jonestown, TX (US); Gordon M. McIndoe, Volente, TX (US); Travis J. Miller, Austin, TX (US); Ryan D. Nelms, Weatherford, TX (US); Matthew Simister, Austin, TX (US); Ned W. Wright, Toledo, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/174,527

(22) Filed: Feb. 24, 2023

(65) Prior Publication Data
US 2023/0216374 A1    Jul. 6, 2023

Related U.S. Application Data

(62) Division of application No. 16/589,185, filed on Oct. 1, 2019, now Pat. No. 11,621,606.

(60) Provisional application No. 62/739,643, filed on Oct. 1, 2018.

(51) Int. Cl.
H02K 7/00      (2006.01)
B60K 6/36      (2007.10)
F16H 3/12      (2006.01)
H02K 7/116     (2006.01)
F16H 3/093     (2006.01)

(52) U.S. Cl.
CPC .............. *H02K 7/1163* (2013.01); *B60K 6/36* (2013.01); *F16H 3/126* (2013.01); *F16H 2003/0936* (2013.01)

(58) Field of Classification Search
CPC .......... H02K 7/1163; B60K 6/36; B60K 6/48; B60K 6/52; B60K 2001/003; B60K 2001/006; B60K 5/04; B60K 11/02; B60K 17/354; B60K 17/356; B60K 2001/001; B60K 1/00; B60K 17/08; F16H 3/126; F16H 2003/0936; F16H 2003/0818; F16H 2200/002; F16H 2200/0034; F16H 3/089; F16H 57/043; F16H 57/0473; F16H 57/0495; F16H 63/3026; Y02T 10/62; F16D 25/0638
See application file for complete search history.

(56) References Cited

U.S. PATENT DOCUMENTS

| | | |
|---|---|---|
| 3,541,791 A | 11/1970 | Lvovsky et al. |
| 5,024,306 A | 6/1991 | Fukui et al. |
| 5,620,387 A | 4/1997 | Janiszewski |
| 8,845,469 B2 | 9/2014 | Buffet |
| 9,033,839 B2 | 5/2015 | Rossey et al. |
| 9,062,744 B2 | 6/2015 | Valente et al. |
| 11,286,995 B1 | 3/2022 | Ganesan et al. |
| 2008/0176707 A1 | 7/2008 | Yamamoto et al. |

(Continued)

*Primary Examiner* — Victor L MacArthur
(74) *Attorney, Agent, or Firm* — McCoy Russell LLP

(57) ABSTRACT

An electric drive axle of a vehicle includes an electric motor having an output shaft. An idler assembly is drivingly coupled to the electric motor and a differential. The idler assembly includes a first gear-clutch assembly to facilitate a first gear ratio and a second gear-clutch assembly to facilitate a second gear ratio.

10 Claims, 12 Drawing Sheets

(56) References Cited

U.S. PATENT DOCUMENTS

| | | |
|---|---|---|
| 2010/0025180 A1 | 2/2010 | Kanno et al. |
| 2010/0122887 A1 | 5/2010 | Pritchard et al. |
| 2010/0206253 A1 | 8/2010 | Fujimoto et al. |
| 2011/0218716 A1 | 9/2011 | Olsson et al. |
| 2017/0136867 A1 | 5/2017 | Holmes et al. |
| 2017/0204941 A1 | 7/2017 | Tseng et al. |
| 2018/0266497 A1 | 9/2018 | Herman et al. |
| 2019/0078674 A1 | 3/2019 | Dzafic et al. |
| 2019/0234469 A1 | 8/2019 | Devendran et al. |

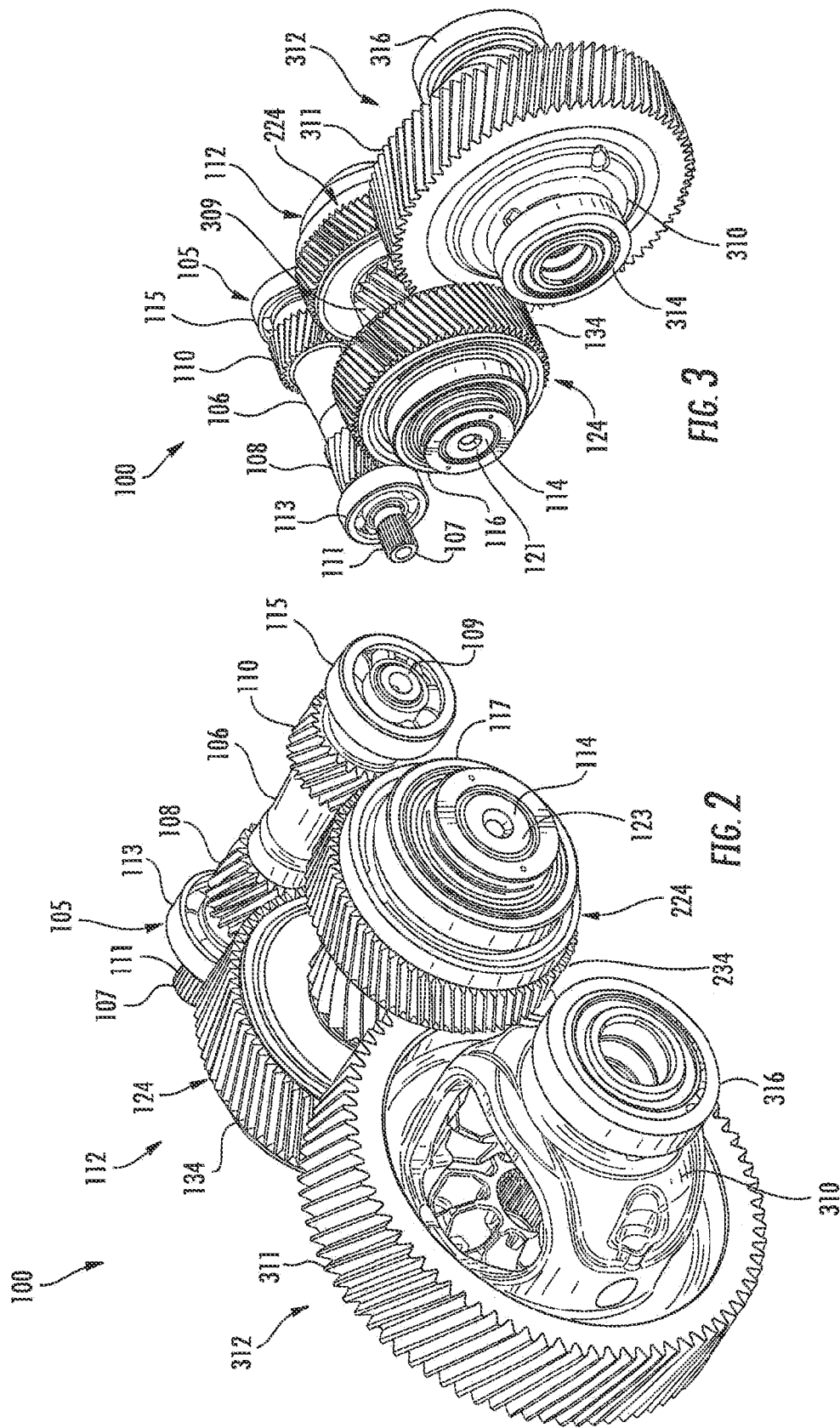

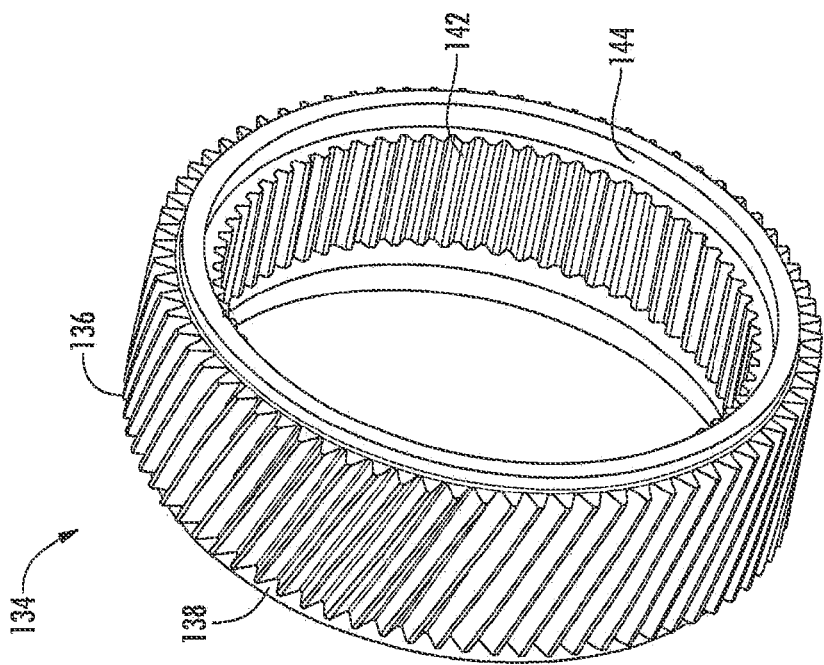
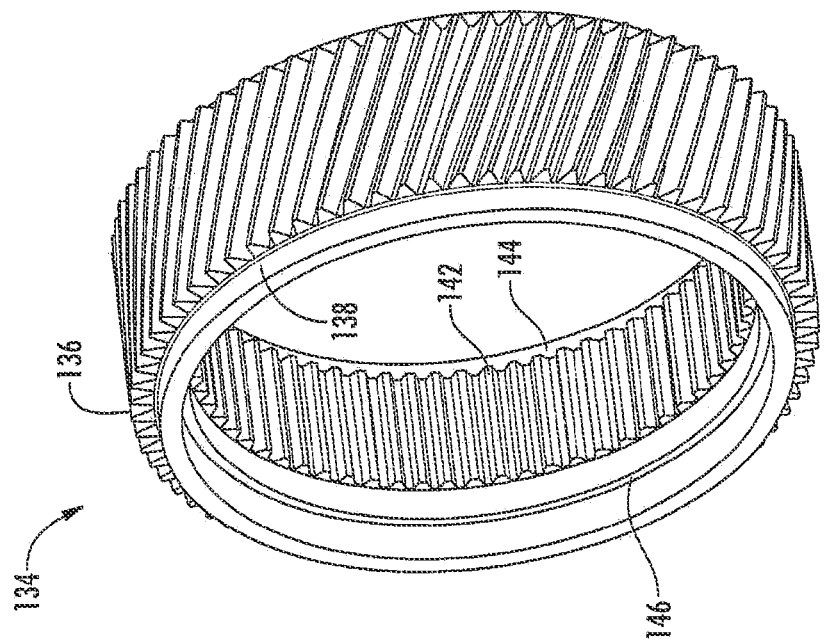

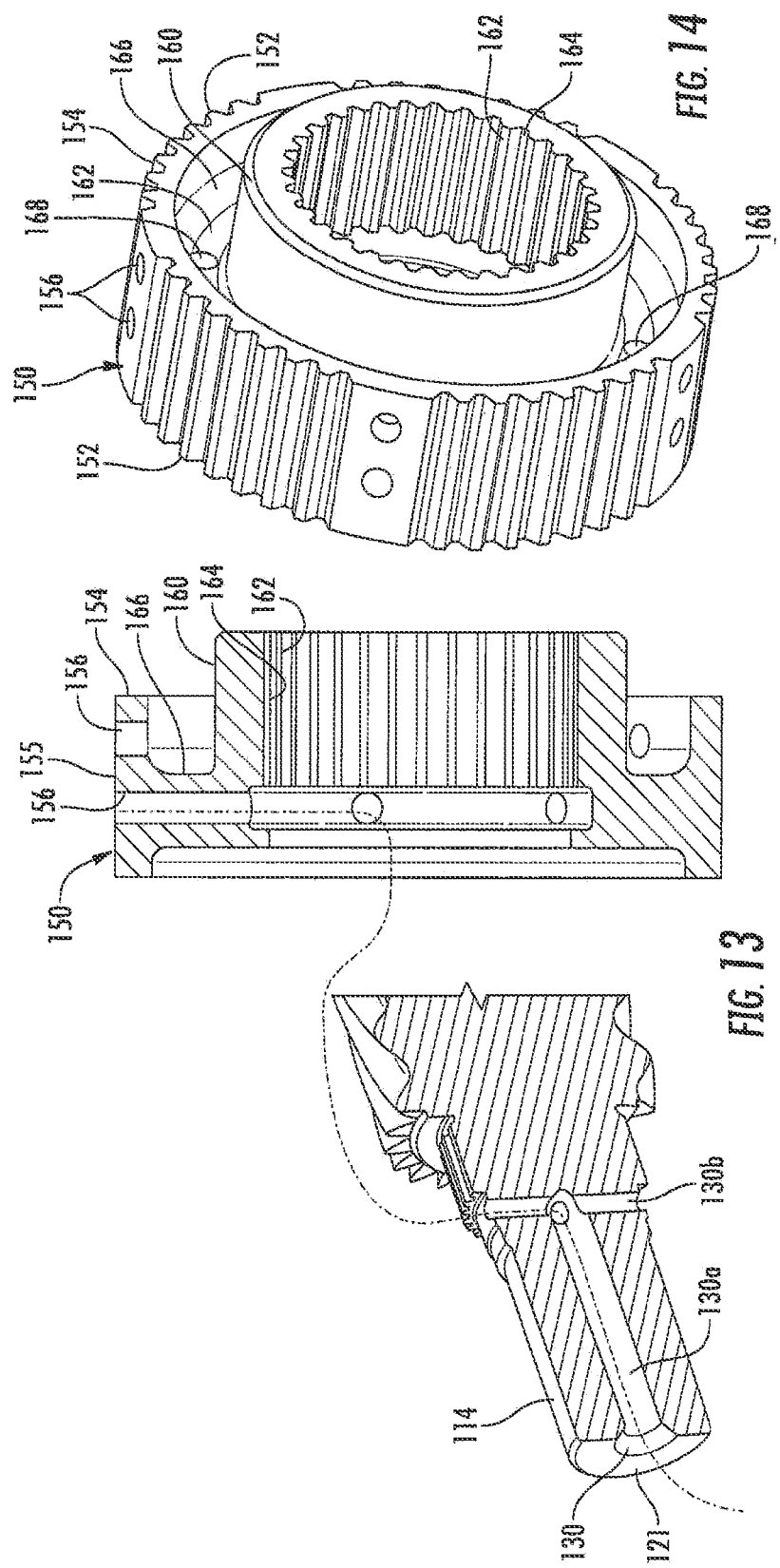

US 11,949,319 B2

MULTI-SPEED GEARBOX AND THE DRIVE AXLE MADE THEREWITH

CROSS REFERENCE TO RELATED APPLICATIONS

The present patent application is a divisional of U.S. Non-Provisional patent application Ser. No. 16/589,185, entitled "MULTI-SPEED GEARBOX AND THE DRIVE AXLE MADE THEREWITH", and filed on Oct. 1, 2019. U.S. Non-Provisional patent application Ser. No. 16/589,185 claims the benefit of U.S. Provisional Patent Application No. 62/739,643, filed Oct. 1, 2018, which is fully incorporated herein by reference in its entirety.

FIELD

The present disclosure relates to electric drive axles, and more particularly to a multi-speed gearbox for an electric drive axle.

BACKGROUND

Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

As electric vehicles are becoming more common, the performance of the electric drive axle is becoming more important. However, in order for the conventional electric vehicle to achieve sufficient speed, the electric motor must allow for reasonable power over a broad speed range. An electric motor which can provide reasonable power over a broad speed range is typically large and heavy. Conventional one-speed transmissions cannot be effectively used. For example, the climbing capability is poor, the start-up is energy consuming, and the efficiency is low. Moreover, when driving down a slope, the speed is accelerated, the electric motor may be dragged, and may even fail.

Accordingly, it would be desirable to produce an electric drive axle having a gear arrangement, at least one clutch assembly, and differential which generates a plurality of gear ratios, and yet remains compact in size and weight.

SUMMARY

In concordance and agreement with the present disclosure, an electric drive axle having a gear arrangement, at least one clutch assembly, and differential which generates a plurality of gear ratios, and yet remains compact in size and weight, has surprisingly been discovered.

The present disclosure provides for an electric drive axle for a vehicle. The electric drive axle is directed to a multi-speed gearbox which is capable of providing two gear ratios to satisfy a driver's different requirements of driving the electric vehicle at high-torque, low-speed or driving at low-torque, high-speed. The multi-speed gearbox has two gear-clutch assemblies to enable a high energy utilization rate and strong climbing capability.

In one embodiment, an electric drive axle, comprises: an electric motor; and an idler assembly drivingly coupled to the electric motor, the idler assembly including a rotatable shaft and at least one gear-clutch assembly disposed about the rotatable shaft, wherein the rotatable shaft includes at least one fluid passage formed therein to provide a first fluid to the gear-clutch assembly.

As aspects of certain embodiments, the at least one gear-clutch assembly includes a gear having a clutch at least partially disposed therein.

As aspects of certain embodiments, the clutch includes a clutch drum disposed at least partially concentrically within the gear.

As aspects of certain embodiments, the clutch further includes a plurality of first clutch plates and a plurality of second clutch plates, and wherein the first clutch plates are in slidable engagement with the gear and the second clutch plates are in slidable engagement with the clutch drum.

As aspects of certain embodiments, the clutch drum includes at least one aperture formed therein which is in fluid communication with the at least one fluid passage.

As aspects of certain embodiments, the at least one fluid passage includes a first flow path formed along a longitudinal axis of the rotatable shaft and a second flow path formed substantially perpendicular to the longitudinal axis of the rotatable shaft.

As aspects of certain embodiments, the gear-clutch assembly further includes at least one support plate having another fluid passage formed therein to provide a second fluid thereto.

As aspects of certain embodiments, the first fluid lubricates the gear-clutch assembly and the second fluid actuates the gear-clutch assembly.

In another embodiment, an electric drive axle, comprises: an electric motor; and an idler assembly drivingly coupled to the electric motor, the idler assembly including a rotatable shaft and at least one gear-clutch assembly disposed about the rotatable shaft, wherein the at least one gear-clutch assembly includes a gear having a plurality of teeth formed on an outer surface thereof and a clutch at least, partially disposed in the gear, wherein the clutch includes a plurality of clutch plates in direct contact with an inner surface of the gear.

As aspects of certain embodiments, the clutch includes a clutch drum disposed at least partially concentrically within the gear.

As aspects of certain embodiments, the clutch plates are in direct contact with an outer surface of the clutch drum.

As aspects of certain embodiments, the clutch plates are in splined engagement with at least one of the gear and the clutch drum.

In yet another embodiment, a method of operating a gear-clutch assembly, comprises providing an idler assembly including a rotatable shaft having a first gear-clutch assembly selectively coupled to a first end thereof and a second gear-clutch assembly selectively coupled to a second end thereof; and providing a first fluid source in fluid communication with at least one of the first gear-clutch assembly and the second gear-clutch assembly through at least one fluid passage; and selectively causing a first fluid to flow from the first fluid source to facilitate at least one of selective engagement and lubrication to at least one of the first and second gear-clutch assemblies.

As aspects of certain embodiments, the method further comprises selectively causing a second fluid to flow from a second fluid source to facilitate at least one of selective engagement and lubrication to at least one of the first and second gear-clutch assemblies.

As aspects of certain embodiments, the first fluid and the second fluid are different fluids.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 2 is a side perspective view of a portion of an electric drive axle of the vehicle driveline shown in FIG. 1 according to an embodiment, including a motor output assembly, a compound idler assembly, and a differential;

FIG. 3 is an opposite side perspective view of the portion of the electric drive axle shown in FIG. 2;

FIG. 11 is a side perspective view of a gear of the compound idler assembly shown in FIGS. 2-9;

FIG. 12 is an opposite side perspective view of the gear of the compound idler assembly shown in FIG. 11;

FIG. 13 is a side elevational view of a first clutch hub and a fragmentary sectional view of an idler shaft of the compound idler assembly shown in FIGS. 2-9;

FIG. 14 is a side perspective view of the first clutch hub of the compound idler assembly shown in FIG. 13;

DETAILED DESCRIPTION

Figure 1:
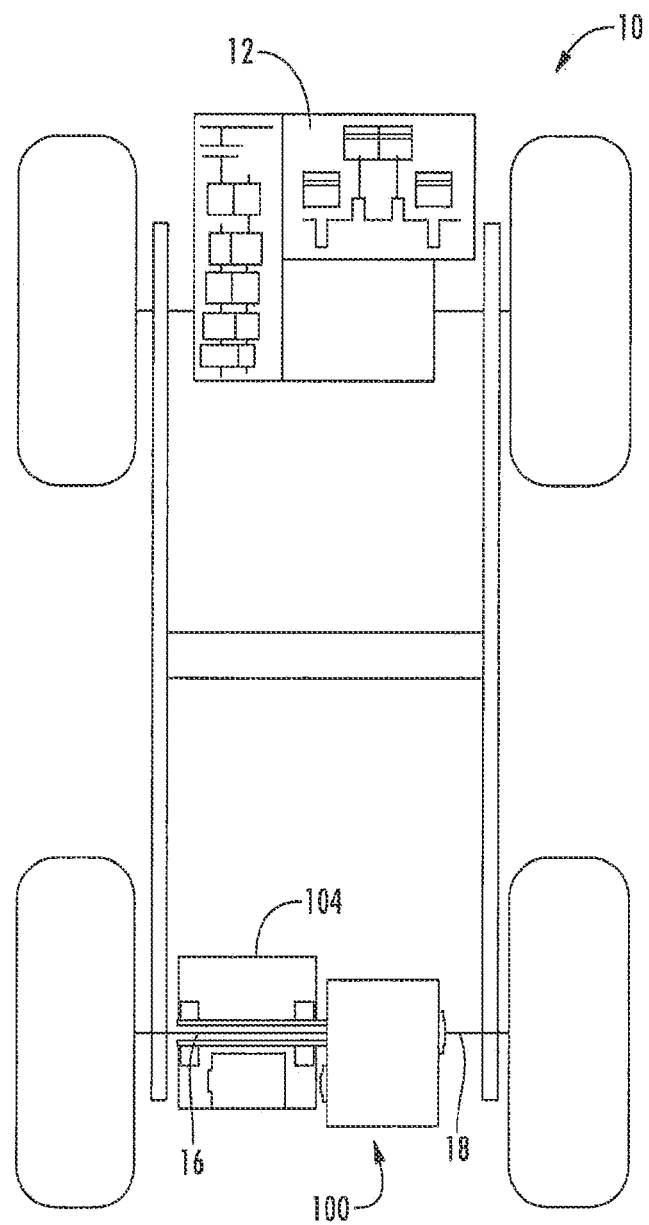
FIG. 1 is a schematic diagram of a vehicle driveline according to an embodiment of the presently disclosed subject matter.
Figure 4:
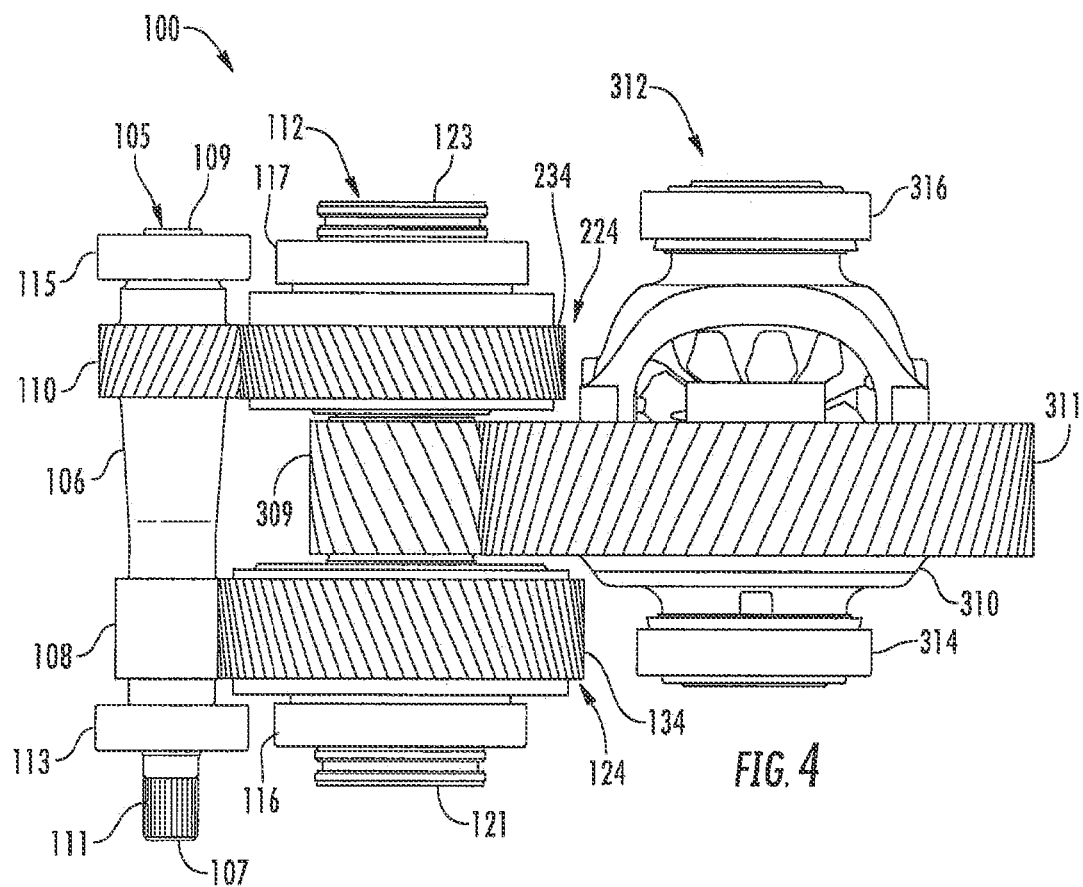
FIG. 4 is a top plan view of the portion of the electric drive axle shown in FIGS. 2-3.
Figure 5:
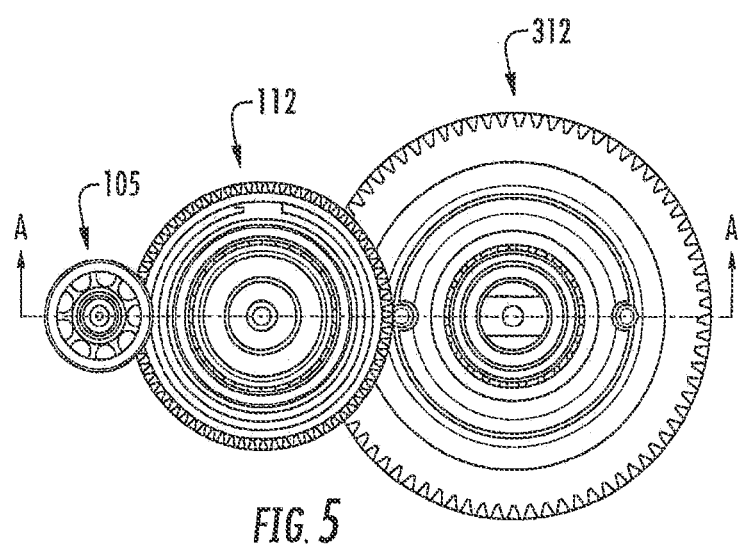
FIG. 5 is a side elevational view of the portion of the electric drive axle shown in FIGS. 2-4.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an electric drive axle 100 are described below. In certain embodiments, the electric drive axle 100 is utilized with a pure electric vehicle (not depicted) where the electric drive axle 100 is the only driving axle. In other embodiments, as illustrated in FIG. 1, the electric drive axle 100 is utilized with a hybrid four-wheel-drive vehicle 10 where the front axle is driven by an internal combustion engine 12, and the rear axle is the electric drive axle 100 (or vice versa). In still other embodiments, the electric drive axle 100 is utilized in a hybrid commercial vehicle (not depicted) comprising a tandem axle in which the front tandem axle is driven by an internal combustion engine, and the rear tandem axle is the electric drive axle 100 (or vice versa). In certain embodiments, the electric drive axle 100 includes a first half axle 16 and a second half axle 18, each of which is coupled to a wheel assembly of the vehicle 10. The electric drive axle 100 may have applications in commercial vehicles, both light duty and heavy duty vehicles, and for passenger, off-highway, and sport utility vehicles. Additionally, the electric drive axle 100 described herein may be adapted for use in front and/or rear driving axles, and in steerable and non-steerable axles. It would be understood by one of ordinary skill in the art that the electric drive axle 100 also has industrial, locomotive, military, agricultural, and aerospace applications.

The electric drive axle 100 may comprise an integrated drive system. In an embodiment shown in FIG. 1, the electric drive axle 100 includes an electric motor 104 (e.g., electromotor) coupled with a power source (not depicted). The electric motor 104 may be a permanent magnet synchronous machine comprising a stator disposed concentrically about a rotor. The electric drive axle 100 may additionally comprise an inverter (not depicted) for converting direct current to alternating current when the electric motor 104 is utilized to drive the vehicle, and for converting alternating current to direct current when the vehicle decelerates. The electric motor 104 may be referred to herein as a motor-generator. Further, the electric drive axle 100 may include cooling fluid (not depicted) such as, but not limited to, automatic transmission fluid or axle oil integrated with the electric drive axle 100 lubricant for cooling the electric motor 104 and the inverter. In another embodiment (not depicted), the cooling "fluid for the electric motor 104 and the inverter may not be integrated with the axle oil. The electric drive may have either a co-axial or off axis layout where the axle shaft connecting the wheel to the differential does not pass through the center or the motor but rather parallel to the motor axis.

A motor output assembly 105 having a motor output shaft 106 is coupled with the rotor of the electric motor 104 for rotation therewith. A first end 107 of the motor output shaft 106 may include a plurality of splines 111 to facilitate coupling to the electric motor 104. It should be appreciated, however, that the motor output assembly 105 can be coupled to the electric motor 104 by various other coupling methods, if desired. In certain embodiments, the motor output shaft 106 has a generally uniform diameter extending from the first end 107 to an opposite second end 109. Yet, in other embodiments shown in FIGS. 2-6, the motor output shaft 106 is tapered having a gradually increasing diameter from the first end 107 to the second 109.

A first gear 108 and a second gear 110 may be coupled with the motor output shaft 106 for rotation therewith. As shown, the first gear 108 is disposed axially adjacent the first end 107 and the second gear 110 is disposed axially adjacent the second end 109. In an embodiment, the first and second gears 108, 110 are forged on the motor output shaft 106. In another embodiment, the first and second gears 108, 110 may be welded to the motor output shaft 106. In still another embodiment, the first and second gears 108, 110 may be splined to the motor output shaft 106. First and second bearings 113, 115, respectively, may also be disposed axially adjacent the first end 107 and the second end 109, respectively, to rotatably support the motor output assembly 106 in a housing (not depicted) such as an axle housing, for example. Various types of bearings 113, 115 such as a roller bearing, a ball bearing, a tapered bearing, and the like, for example, may be employed.

In certain embodiments, the electric motor 104 drives a compound idler assembly 112 via the motor output shaft 106 and the first and second gears 108, 110. As shown, the motor output assembly 105, the compound idler assembly 112, and axle half shafts 16, 18 are disposed offset and parallel relative to one another. It is understood, however, that the motor output assembly 105, the compound idler assembly 112, and the axle half shafts 16, 18 may be disposed co-axially relative to one another.

Figure 9:
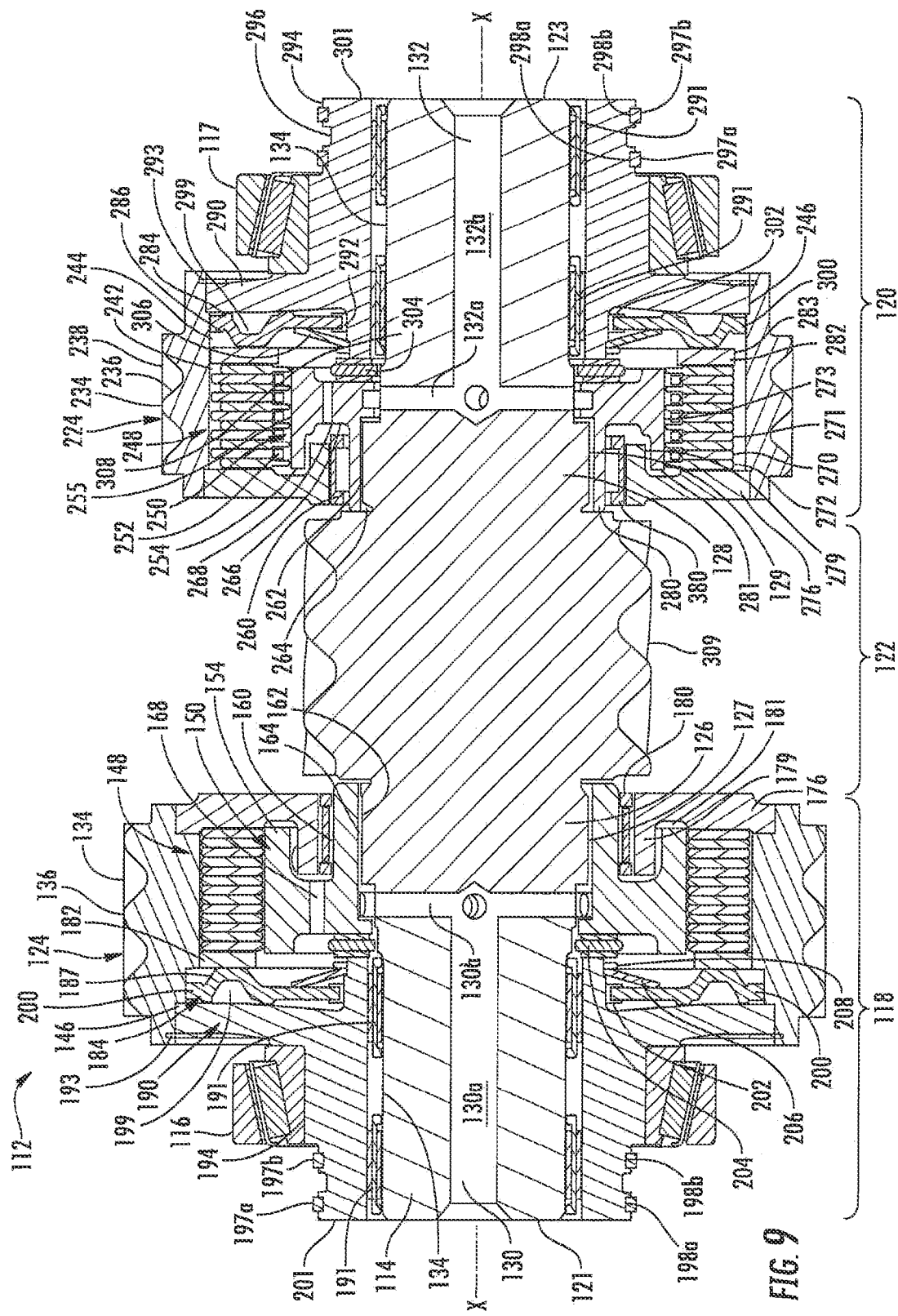
FIG. 9 is a cross-sectional view taken along section line B-B detailed in FIG. 8 of the compound idler assembly shown in FIGS. 2-8.

The compound idler assembly 112 includes an idler shaft 114 rotatably supported in a housing (not depicted) such as an axle housing, for example, via first and second bearings 116, 117. As more clearly shown in FIG. 9, the idler shaft 114 has an outer first segment 118, an outer second segment 120, and an intermediate third segment 122 interposed axially between the first and second segments 118, 120. The first and second segments 118, 120 form opposing ends 121, 123, respectively, of the idler shaft 114. In certain embodiments, a diameter of the first segment 118 is substantially equivalent to a diameter of the second segment 120. A diameter of the third segment 122 shown is greater than the diameters of the segments 118, 120. It is understood, however, that the diameter of each of the segments 118, 120, 122 may be any diameter as desired. As more clearly shown in FIG. 9, respective inner portions 126, 128 of the segments 118, 120 may include a plurality of splines 127, 129 formed thereon. Each of the segments 118, 120 may also include a first fluid passage 130, 132, respectively, formed therein. The first fluid passages 130, 132 are in fluid communication with a first fluid source (not depicted) and configured to receive a first fluid (not depicted) therethrough. Various types of fluid can be used for the first fluid as desired such as a lubricant, for example. As shown, the respective first fluid passages 130, 132 comprise a first flow path 130a, 132a and a second flow path 130b, 132b. The first flow paths 130a, 132a are formed along a longitudinal axis X-X of the idler shaft 114 extending axially inward from respective ends 121, 123 of the idler shaft 114 to generally a midpoint of each of the segments 118, 120. The second flow paths 130b, 132b are formed substantially perpendicular to the longitudinal axis X-X of the idler shaft 114 extending radially outward from the first flow paths 130a, 132a to an outer peripheral surface 134 of the idler shaft 114. As shown in FIG. 9, the idler shaft 114 includes a pair of second flow paths, 130b, 132b which are axially and radially aligned to form a unitary flow path therethrough. It should be appreciated that any number of first and second flow paths 130a, 132a, 130b, 132b may be formed in the idler shaft 114 if desired.

Figure 10:
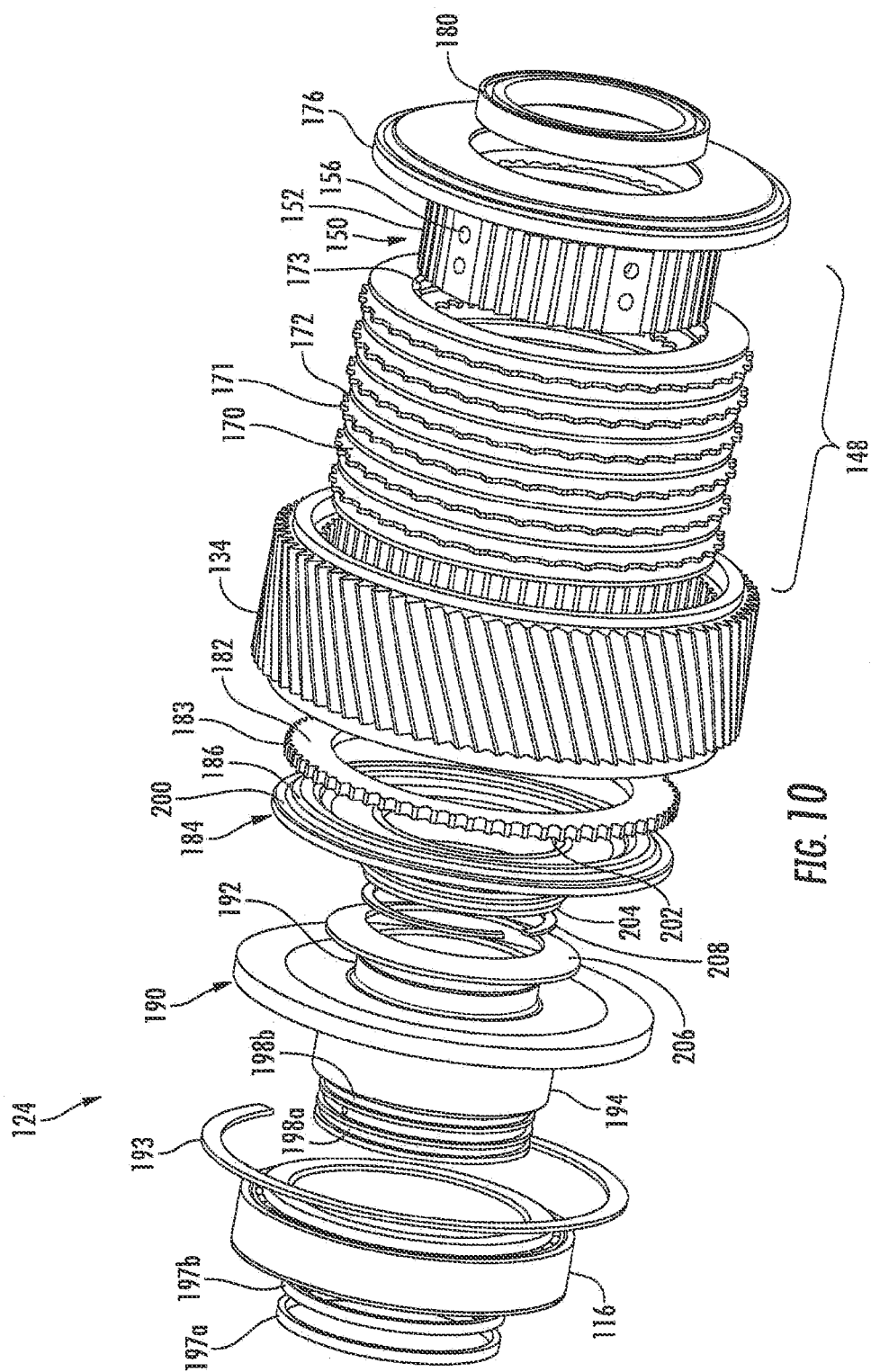
FIG. 10 is an exploded view of the compound idler assembly shown in FIGS. 2-9.

A first gear-clutch assembly 124 is disposed concentrically about the first segment 118 of the idler shaft 114. The first gear-clutch assembly 124 is in meshed engagement with the first gear 108 of the output shaft 106 of the electric motor 104 and receives torque therefrom. As illustrated in FIGS. 9-10, the first gear-clutch assembly 124 includes a third gear 134 disposed concentrically about at least a portion of the first segment 118 of the idler shaft 114. As illustrated in FIGS. 2-6, the third gear 134 is generally ring-shaped. In an embodiment shown in FIGS. 11-12, the third gear 134 includes a plurality of teeth 136 extending radially outward from an outer surface 138 thereof. A plurality of splines 142 is formed on an inner surface 144 of the third gear 134 extending radially inward therefrom. The inner surface 144 of the third gear 134 may also include an annular shoulder 146, shown in FIG. 11, formed therein.

Referring now to FIGS. 9-10, the third gear 134 is configured to receive a first clutch 148 therein. The first clutch 148 includes a first clutch drum 150 disposed at least partially concentrically within the third gear 134. A plurality of splines 152 is formed on an annular flange portion 154 of the first clutch drum 150 extending radially outward from an outer surface 155 thereof. The annular flange portion 154 may also include at least one aperture 156 formed therethrough. As illustrated, a pair of apertures 156 is formed at various intervals about a circumference of the annular flange portion 154. It is understood that any number of apertures 156 can be formed at any position in the first clutch drum 150 as desired. As shown in FIG. 13, each of the apertures 156 is in fluid communication with the first fluid passage 130 formed in the idler shaft 114.

The first clutch drum 150 further includes an annular hub 160 formed concentrically within and extending axially outward from the annular flange portion 154. In certain embodiments, an inner surface 164 of the annular hub 160 includes a plurality of splines 162 formed thereon. The splines 162 of the annular hub 160 are configured to cooperate with the splines 127 formed on the first segment 118 of the idler shaft 114 to couple the annular hub 160 thereto and transfer the torque from the first clutch drum 150 to the idler shaft 114. In other embodiments, the first clutch drum 150 may be coupled to the idler shaft 114 by a press fit. In yet other embodiments, the first clutch drum 150 may be integrally formed with the idler shaft 114 as a unitary component. Accordingly, it should be appreciated that the first clutch drum 150 can be coupled to the idler shaft 114 by any suitable method as desired.

A web portion 166 is formed to extend between the annular flange portion 154 of the first clutch drum 150 and the annular hub 160. The web portion 166 may include at least one aperture 168 formed therethrough. As illustrated in FIG. 14, a plurality of apertures 168 is formed at various intervals about a circumference of the web portion 166. It is understood that any number of apertures 168 can be formed at any position in the web portion 166 as desired. Each of the apertures 168 is in fluid communication with the first fluid passage 130 formed in the idler shaft 114. The apertures 156, 168 and the first fluid passage 130 are fluidly connected to facilitate a flow of the first fluid from the first fluid source to the first clutch 148. In certain embodiments, the flow of the first fluid from the fluid source provides lubrication to the first clutch 148 of the first gear-clutch assembly 124.

As more clearly shown in FIGS. 9-10, the first clutch 148 includes a plurality of first clutch plates 170 interleaved with a plurality of second clutch plates 172. Each of the clutch plates 170, 172 is concentrically disposed about the first clutch hub 150 and within the third gear 134. The first clutch plates 170 are in meshed engagement with the third gear 134. In certain embodiments, each of the first clutch plates 170 includes a plurality of splines 171 extending radially outward therefrom. The splines 171 of the first clutch plates 170 cooperate with the splines 142 formed on the inner surface 144 of the third gear 134. As such, the first clutch plates 170 receive torque from the third gear 134. The first clutch plates 170 may move axially relative to the third gear 134 and the first clutch hub 150 within the first gear-clutch assembly 124. The first clutch plates 170 transfer the torque from the third gear 134 to the second clutch plates 172. It is understood that the first clutch plates 170 can be coupled to the third gear 134, while permitting an axial movement thereof, by any suitable method as desired.

A plurality of second clutch plates 172 are in meshed engagement with the first clutch hub 150. In certain embodiments, each of the second clutch plates 172 includes a plurality of splines 173 extending radially inward therefrom. The splines 173 of the second clutch plates 172 cooperate with the splines 152 formed on the outer surface 154 of the first clutch hub 150. As such, the second clutch plates 172 receive the torque from the first clutch plates 170. The second clutch plates 172 may move axially relative the third gear 134 and the first clutch hub 150 within the first gear-clutch assembly 124. The second clutch plates 172 transfer the torque from the first clutch plates 170 to the first clutch hub 150, and thereby the idler shaft 114. It is understood that the second clutch plates 172 can be coupled to the first clutch hub 150, while permitting an axial movement thereof, by any suitable method as desired.

A first support plate 176 is disposed at a first side of the first clutch 148 within the third gear 134. The first support plate 176 is generally ring-shaped and concentrically disposed about the idler shaft 114 of the compound idler assembly 112. The first support plate 176 performs as an abutment for the clutch plates 170, 172 during engagement of the first clutch 148. In certain embodiments, the first support plate 176 includes an annular hub 179, shown in FIG. 9, concentrically disposed about the annular hub 160 of the first clutch hub 150. The annular hub 179 of the first support plate 176 is configured to be received in an annular cavity formed by the annular hub 160, the annular flange portion 154, and the web portion 166 of the first clutch hub 150. In other embodiments, the first support plate 176 includes an annular recess 181 formed therein. The annular recess 181 is configured to receive at least a portion of the annular flange portion 154 of the first clutch hub 150 therein.

Figure 18:
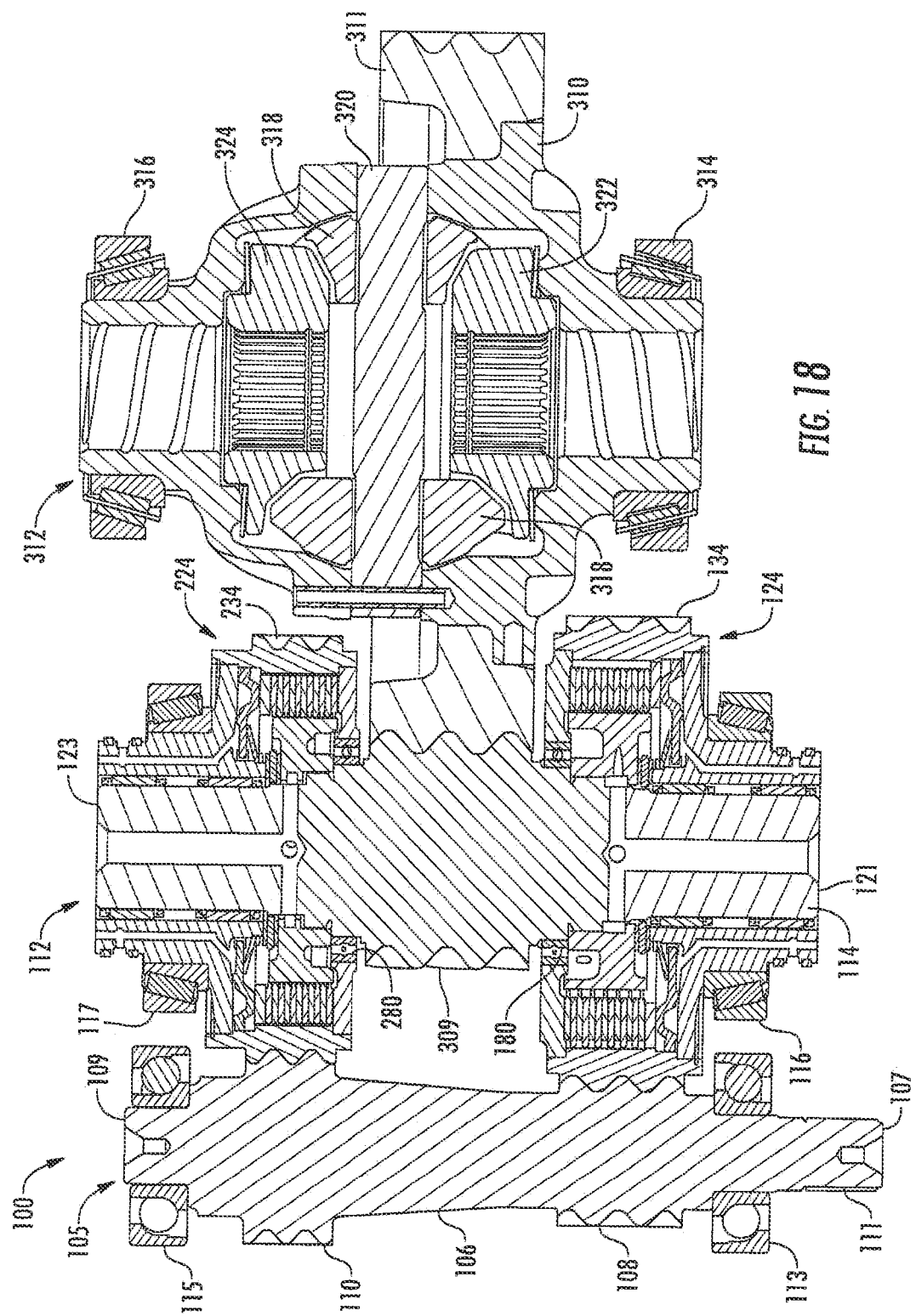
FIG. 18 is a cross-sectional view taken along section line A-A detailed in FIG. 5 of the portion of the electric drive axle shown in FIGS. 2-5 according to another embodiment of the present disclosure, including a motor output assembly, a compound idler assembly, and a differential.
Figure 19:
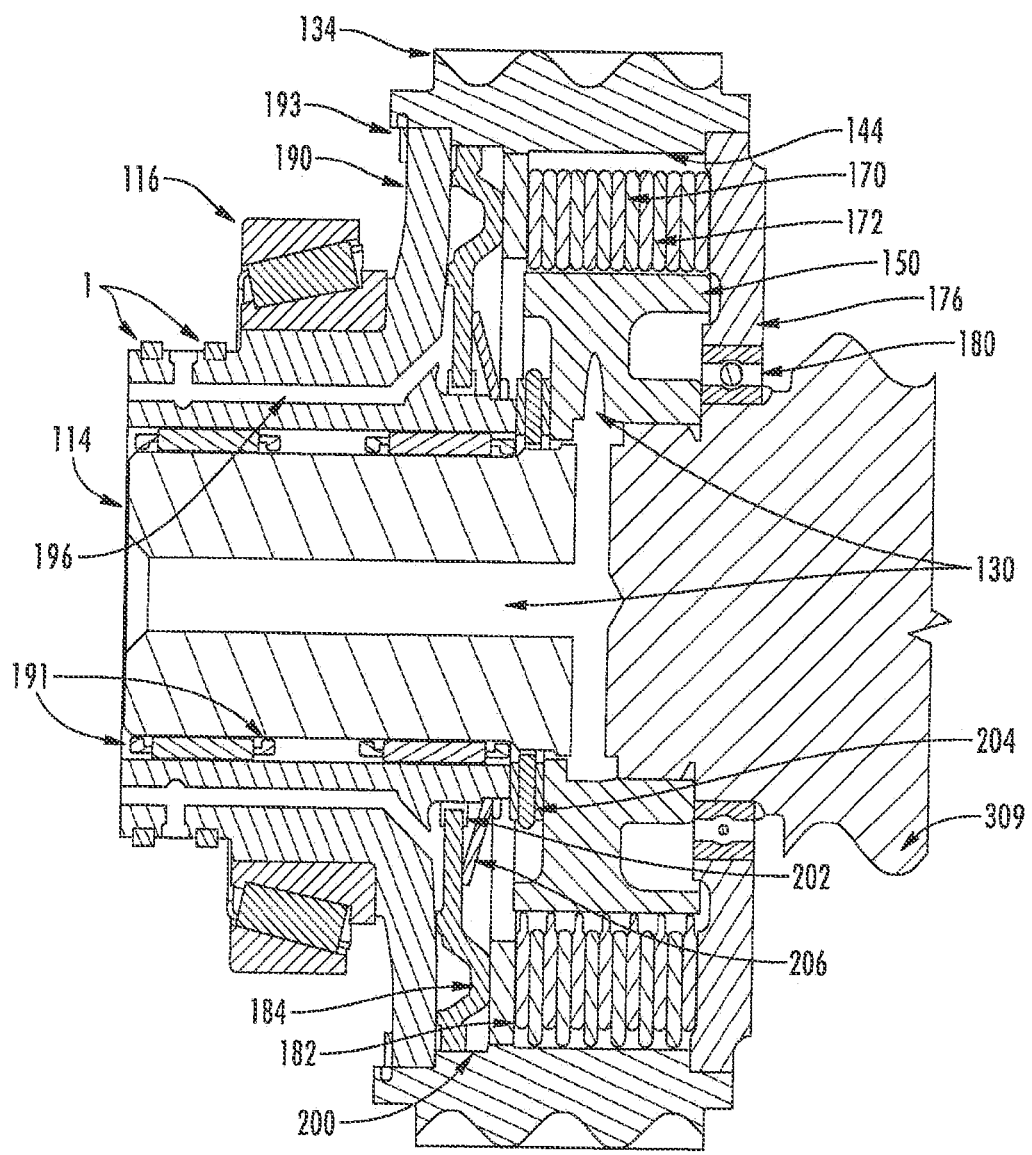
FIG. 19 is an enlarged fragmentary sectional view of a portion of the compound idler assembly.

In an embodiment shown in FIG. 9, a bearing 180 is interposed between the first support plate 176 and the annular hub 160 of the first clutch plate 150. Yet, in another embodiment shown in FIGS. 18-19, the bearing 180 is interposed between the first support plate 176 and the idler shaft 114. The bearing 180 provides rotational support of the first support plate 176. Various types of bearings 180 may be employed as desired. For example, the bearing 180 may be a needle bearing.

As more clearly illustrated FIGS. 9-10, a pressure plate 182 may be disposed at an opposite second side of the first clutch 148 within the third gear 134. The pressure plate 182 is also generally ring-shaped and concentrically disposed about the idler shaft 114 of the compound idler-assembly 112. The pressure plate 182 includes a plurality of splines 183 extending radially outward therefrom. The splines 183 of the pressure plate 182 cooperate with the splines 142 formed on the inner surface 144 of the third gear 134. The pressure plate 182 may move axially relative the third gear 134 and the first clutch hub 150 within the first gear-clutch assembly 124. The pressure plate 182 is configured to urge the clutch plates 170, 172 in a first axial direction towards the first support plate 176 during engagement of the first clutch 148. It is understood that the pressure plate 182 can be coupled to the third gear 134, while permitting an axial movement thereof, by any suitable method as desired.

As illustrated in FIG. 9, a piston member 184 may also be concentrically disposed about the idler shaft 114 axially adjacent to the pressure plate 182. The piston member 184 includes an axially extending annular portion 186. The axially extending annular portion 186 protrudes towards the pressure plate 182 when assembled. The annular portion 186 of the piston member 184 abuts the pressure plate 182 and is configured to urge the pressure plate 182 in the first axial direction towards the first support plate 176 during engagement of the first clutch 148.

In certain embodiments, the first gear-clutch assembly 124 further includes a second support plate 190. The second support plate 190 is concentrically disposed about the idler shaft 114 axially adjacent to the piston member 184. At least one bearing 191, shown in FIG. 9, may interposed between the second support plate 190 and the idler shaft 114. The at least one bearing 191 provides rotational support of the second support plate 190. Various types of bearings 191 may be employed as desired. For example, the at least one bearing 191 may be a needle bearing.

In certain embodiments, the second support plate 190 abuts the annular shoulder 146 formed in the third gear 134. A positioning element 193 may be disposed axially adjacent the second support plate 190 opposite the annular shoulder 146 in the third gear 134 to maintain an axial position of the second support plate 190. The second support plate 190 includes a first annular portion 192 extending axially toward the first clutch 148 and a second annular portion 194 extending axially away from the first clutch 148. As illustrated in FIG. 9, the first annular portion 192 is interposed between the piston member 184 and the idler shaft 114.

Figure 17:
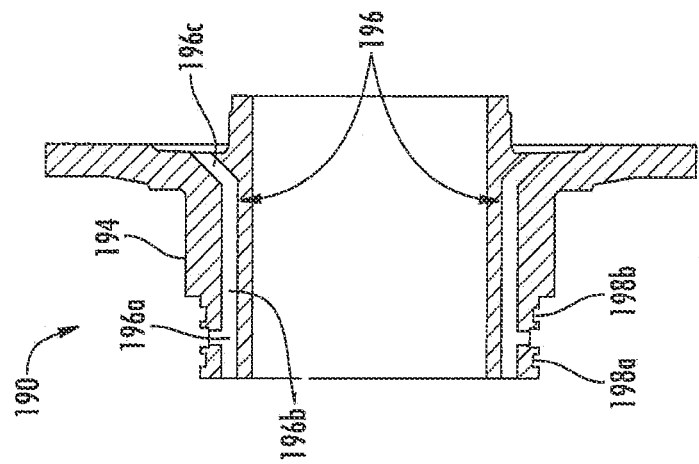
FIG. 17 is a cross-sectional view of the support plate of the compound idler assembly shown in FIGS. 9-10 and 15-16.
Figure 16:
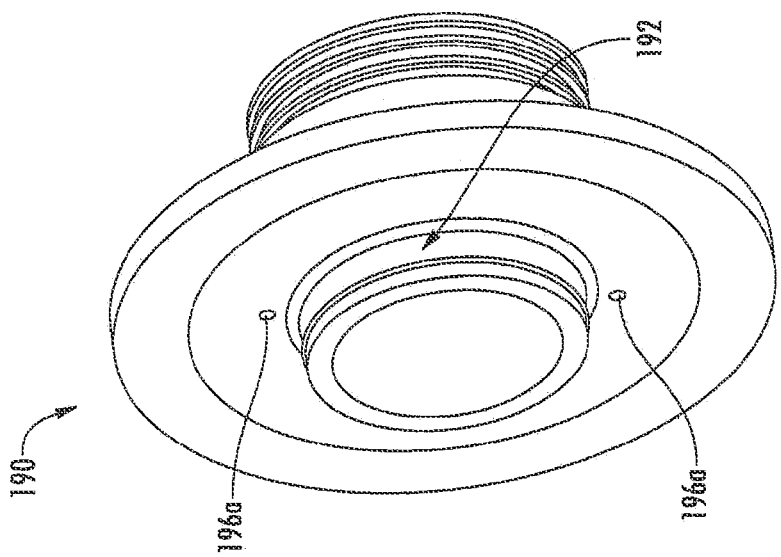
FIG. 16 is a side perspective view of the support plate of the compound idler assembly shown in FIGS. 9-10 and 15.
Figure 15:
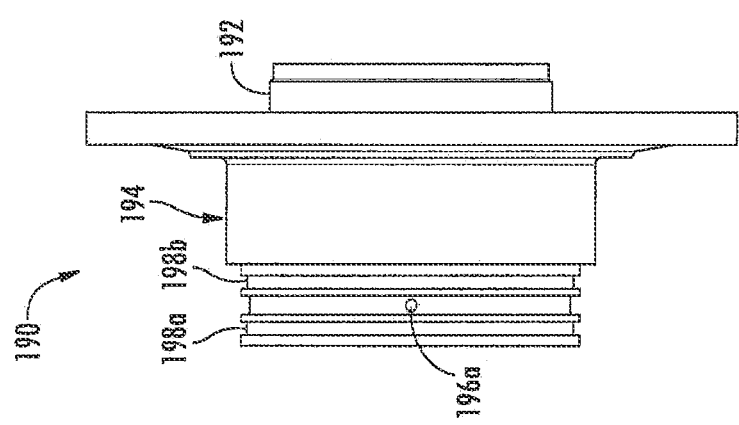
FIG. 15 is a side elevational view of a support plate of the compound idler assembly shown in FIGS. 9-10.

The bearing 116 may be concentrically disposed about the second annular portion 194 of the second support plate 190. As illustrated in FIG. 17, the second annular portion 194 may also include a second fluid passage 196 formed therein. The second fluid passage 196 is in fluid communication with a second fluid source (not depicted) and configured to receive a second fluid (not depicted) therethrough. Various types of second fluids from various second fluid sources can be used as desired such as a hydraulic fluid from a hydraulic manifold, for example. As shown, the second fluid passage 196 comprises a first flow path 196*a*, a second flow path 196*b*, and a third flow path 196*c*. The first flow path 196*a* is formed perpendicular to the longitudinal axis X-X of the idler shaft 114, the second flow path 196*b* is formed parallel to the longitudinal axis X-X of the idler shaft 114, and the third flow path 196*c* is formed at an angle with respect to the longitudinal axis X-X of the idler shaft 114. It should be appreciated that any number of flow paths 196*a*, 196*b*, 196*c* may be formed in the second support plate 190 if desired. A pair of sealing members 197*a*, 197*b* are concentrically disposed about the second annular portion 194 of the second support plate 190. The sealing members 197*a*, 197*b* are disposed in a pair of grooves 198*a*, 198*b* formed in the second annular portion 194 of the second support plate 190 on opposite sides of the first flow path 196*a* to militate against leakage therefrom. It is understood that any number of sealing members 197*a*, 197*b* may be employed if desired.

As shown, the second fluid passage 196 extends axially inward from an end 201 of the second support plate 190 to a chamber 199 formed between the piston member 184 and the second support plate 190. In certain embodiments, an amount of the second fluid in the chamber 199 is varied to selectively position the piston member 184 for engagement and disengagement of the first clutch 148. A first sealing member 200 is interposed between the piston member 184 and the inner surface 144 of the third gear 134 and a second sealing member 202 is interposed between the piston member 184 and the second support plate 190 to militate against leakage of the second fluid from the chamber 199 during operation of the first gear-clutch assembly 124.

A thrust bearing 204 is concentrically disposed about the idler shaft 114 and axially between the second support plate 190 and the first clutch hub 150. The thrust bearing 204 is configured to militate against frictional contact between the second support plate 190 and the first clutch hub 150. As illustrated, the first gear-clutch assembly 124 may further includes a biasing member 206. The biasing member 206 is configured to urge the piston member 184 in an opposite second axial direction during an operation of the first clutch 148. The biasing member 206 may be concentrically disposed about the first annular portion 192 of the second support plate 190 and axially between the piston member 184 and the thrust bearing 204. A positioning member 208 may be concentrically disposed about the first annular portion 192 of the second support plate 190 and axially adjacent the biasing member 206 to militate against a movement of the biasing member 206 in the first axial direction during operation of the first clutch 148.

Similarly, a second gear-clutch assembly 224 is disposed concentrically about the second segment 120 of the idler shaft 114. The second gear-clutch assembly 224 is in meshed engagement with the second gear 110 of the output shaft 106 of the electric motor 104 and receives torque therefrom. As illustrated in FIGS. 9-10, the second gear-clutch assembly 224 includes a fourth gear 234 disposed concentrically about at least a portion of the second segment 120 of the idler shaft 114. As illustrated in FIGS. 2-6, the fourth gear 234 is generally ringshaped. In an embodiment shown in FIG. 9, the fourth gear 234 includes a plurality of teeth 236 extending radially outward from an outer surface 238 thereof. A plurality of splines 242 is formed on an inner surface 244 of the fourth gear 234 extending radially inward therefrom. The inner surface 244 of the fourth gear 234 may also include an annular shoulder 246 formed therein.

Referring now to FIG. 9, the fourth gear 234 is configured to receive a second clutch 248 therein. The second clutch 248 includes a second clutch drum 250 disposed at least partially concentrically within the fourth gear 234. A plurality of splines 252 is formed on an annular flange portion 254 of the second clutch drum 250 extending radially outward from an outer surface 255 thereof. The annular flange portion 254 may also include at least one aperture (not depicted) formed therethrough. A pair of the apertures may be formed at various intervals about a circumference of the annular flange portion 254. It is understood that any number of the apertures may be formed at any position in the second clutch drum 250 as desired. Each of the apertures may be in fluid communication with the first fluid passage 132 formed in the idler shaft 114.

The second clutch drum 250 further includes an annular hub 260 formed concentrically within and extending axially outward from the annular flange portion 254. In certain embodiments, an inner surface 264 of the annular hub 260 includes a plurality of splines 262 formed thereon. The splines 262 of the annular hub 260 are configured to cooperate with the splines 129 formed on the second segment 120 of the idler shaft 114 to couple the annular hub 260 thereto and transfer the torque from the second clutch drum 250 to the idler shaft 114. In other embodiments, the second clutch drum 250 may be coupled to the idler shaft 114 by a press fit. In yet other embodiments, the second clutch drum 250 may be integrally formed with the idler shaft 114 as a unitary component. Accordingly, it should be appreciated that the first clutch drum 250 can be coupled to the idler shaft 114 by any suitable method as desired.

A web portion 266 is formed to extend between the annular flange portion 254 of the second clutch drum 250 and the annular hub 260. The web portion 266 may include at least one aperture 268 formed therethrough. A plurality of the apertures 268 may be formed at various intervals about a circumference of the web portion 266. It is understood that any number of apertures 268 can be formed at any position in the web portion 266 as desired. Each of the apertures 268 may be in fluid communication with the first fluid passage 132 formed in the idler shaft 114. The apertures (not depicted), 268 and the first fluid passage 132 are fluidly connected to facilitate a flow of the first fluid from the first fluid source to the second clutch 248. In certain embodiments, the flow of the first fluid from the first fluid source provides lubrication to the second clutch 248 of the second gear-clutch assembly 224.

As more clearly shown in FIG. 9, the second clutch 248 includes a plurality of first clutch plates 270 interleaved with a plurality of second clutch plates 272. Each of the clutch plates 270, 272 is concentrically disposed about the second clutch hub 250 and within the fourth gear 234. The first clutch plates 270 are in meshed engagement with the third gear 234. In certain embodiments, each of the first clutch plates 270 includes a plurality of splines 271 extending radially outward therefrom. The splines 271 of the first clutch plates 270 cooperate with the splines 242 formed on the inner surface 244 of the fourth gear 234. As such, the first clutch plates 270 receive torque from the fourth gear 234. The first clutch plates 270 may move axially relative to the fourth gear 234 and the second clutch nub 250 within the second gear-clutch assembly 224. The first clutch plates 270 transfer the torque from the fourth gear 234 to the second clutch plates 272. It is understood that the first clutch plates 270 can be coupled to the fourth gear 234, while permitting an axial movement thereof, by any suitable method as desired.

A plurality of second clutch plates 272 are in meshed engagement with the first clutch hub 250. In certain embodiments, each of the second clutch plates 272 includes a plurality of splines 273 extending radially inward therefrom. The splines 273 of the second clutch plates 272 cooperate with the splines 252 formed on the outer surface 254 of the first clutch hub 250. As such, the second clutch plates 272 receive the torque from the first clutch plates 270. The second clutch plates 272 may move axially relative the fourth gear 234 and the second clutch hub 250 within the second gear-clutch assembly 224. The second clutch plates 272 transfer the torque from the first clutch plates 270 to the second clutch hub 250, and thereby the idler shaft 114. It is, understood that the second clutch plates 272 can be coupled to the second clutch hub 250, while permitting an axial movement thereof, by any suitable method as desired.

A first support plate 276 is disposed at a first side of the second clutch 248 within the fourth gear 234. The first support plate 276 is generally ring-shaped and concentrically disposed about the idler shaft 114 of the compound idler assembly 112. The first support plate 276 performs as an abutment for the clutch plates 270, 272 during engagement of the second clutch 248. In certain embodiments, the first support plate 276 includes an annular hub 279, shown in FIG. 9, concentrically disposed about the annular hub 260 of the second clutch hub 250. The annular hub 279 of the first support plate 276 is configured to be received in an annular cavity formed by the annular hub 260, the annular flange portion 254, and the web portion 266 of the second clutch hub 250. In other embodiments, the first support plate 276 includes an annular recess 281 formed therein. The annular recess 281 is configured to receive at least a portion of the annular flange portion 254 of the second clutch hub 250 therein.

In an embodiment shown in FIG. 9, a bearing 280 is interposed between the first support plate 276 and the annular hub 260 of the second clutch hub 250. Yet, in another embodiment shown in FIG. 18, the bearing 280 is interposed between the first support plate 276 and the idler shaft 114. The bearing 280 provides rotational support of the first support plate 276. Various types of bearings 280 may be employed as desired. For example, the bearing 280 may be a needle bearing.

As more clearly illustrated FIG. 9, a pressure plate 282 may be disposed at an opposite second side of the second clutch 248 within the fourth gear 234. The pressure plate 282 is also generally ring-shaped and concentrically disposed about the idler shaft 114 of the compound idler assembly 112. The pressure plate 282 includes a plurality of splines 283 extending radially outward therefrom. The splines 283 of the pressure plate 282 cooperate with the splines 242 formed on the inner surface 244 of the fourth gear 234. The pressure plate 282 may move axially relative the fourth gear 234 and the second clutch hub 250 within the second gear-clutch assembly 224. The pressure plate 282 is configured to urge the clutch plates 270, 272 in the second axial direction towards the first support plate 276 during engagement of the second clutch 248. It is understood that the pressure plate 282 can be coupled to the fourth gear 234, while permitting an axial movement thereof, by any suitable method as desired.

As illustrated in FIG. 9, a piston member 284 may also be concentrically disposed about the idler shaft 114 axially adjacent to the pressure plate 282. The piston member 284 includes an axially extending annular portion 286. The axially extending annular portion 286 protrudes towards the pressure plate 282 when assembled. The annular portion 286 of the piston member 284 abuts the pressure plate 282 and is configured to urge the pressure plate 282 in the second axial direction towards the first support plate 276 during engagement of the second clutch 248.

In certain embodiments, the second gear-clutch assembly 224 further includes a second support plate 290. The second support plate 290 is concentrically disposed about the idler shaft 114 axially adjacent to the piston member 284. At least one bearing 291 may interposed between the second support plate 290 and the idler shaft 114. The at least one bearing 291 provides rotational support of the second support plate 290. Various types of bearings 291 may be employed as desired. For example, the at least one bearing 291 may be a needle bearing.

In certain embodiments, the second support plate 290 abuts the annular shoulder 246 formed in the fourth gear 234. A positioning element 293 may be disposed axially adjacent the second support plate 290 opposite the annular shoulder 246 in the fourth gear 234 to maintain an axial position of the second support plate 290. The second support plate 290 includes a first annular portion 292 extending axially toward the second clutch 248 and a second annular portion 294 extending axially away from the second clutch 248. As illustrated in FIG. 9, the first annular portion 292 is interposed between the piston member 284 and the idler shaft 114.

The bearing 117 may be concentrically disposed about the second annular portion 294 of the second support plate 290. The second annular portion 294 may also include a third fluid passage 296 formed therein. The third fluid passage 296 is in fluid communication with a third fluid source (not depicted) and configured to ' receive a third fluid (not depicted) therethrough. Various types of third fluids from various third fluid sources can be used as desired such as a hydraulic fluid from a hydraulic manifold, for example. Similar to the second fluid passage 196 of the first gear-clutch assembly 14, the third fluid passage 296 may comprise a first flow path, a second flow path, and a third flow path. The first flow path may be formed perpendicular to the longitudinal axis X-X of the idler shaft 114, the second flow path may be formed parallel to the longitudinal axis X-X of the idler shaft 114, and the third flow path may be formed at an angle with respect to the longitudinal axis XX of the idler shaft 114. It should be appreciated that any number of flow paths may be formed in the second support plate 290 if desired. A pair of sealing members 297a, 297b are concentrically disposed about the second annular portion 294 of the second support plate 290. The sealing member 297a, 297b are disposed in a pair of grooves 298a, 298b formed in the second annular portion 294 of the second support plate 290 on opposite sides of the third fluid passage 296 to militate against leakage therefrom. It is understood that any number of sealing members 297a, 297b may be employed if desired.

As shown, the third fluid passage 296 extends axially inward from an end 301 of the second support plate 290 to a chamber 299 formed between the piston member 284 and the second support plate 290. In certain embodiments, an amount of the third fluid in the chamber 299 is varied to selectively position the piston member 284 for engagement and disengagement of the second clutch 248. A first sealing member 300 is interposed between the piston member 284 and the inner surface 244 of the fourth gear 234 and a second sealing member 302 is interposed between the piston member 284 and the second support plate 290 to militate against leakage of the third fluid from the chamber 299 during operation of the second gear-clutch assembly 224.

A thrust bearing 304 is concentrically disposed about the idler shaft 114 and axially between the second support plate 290 and the second clutch hub 250. The thrust bearing 304 is configured to militate against frictional contact between the second support plate 290 and the second clutch hub 250. As illustrated, the second gear-clutch assembly 224 may further include a biasing member 306. The biasing member 306 is configured to urge the piston member 284 in the first axial direction during an operation of the second clutch 248. The biasing member 306 may be concentrically disposed about the first annular portion 292 of the second support plate 290 and axially between the piston member 284 and the thrust bearing 304. A positioning member 308 may be concentrically disposed about the first annular portion 292 of the second support plate 290 and axially adjacent the biasing member 306 to militate against a movement of the biasing member 306 in the second axial direction during operation of the second clutch 248.

As illustrated in FIGS. 2-9, a fifth gear 309 is disposed concentrically about and coupled with the third segment 122 of the idler shaft 114. In an embodiment, the fifth gear 309 may be forged on the idler shaft 114. The fifth gear 309 is in meshed engagement with a sixth gear 311. As illustrated in FIG. 2-6, the sixth gear 311 is coupled to, and fixed for rotation with, a differential case 310 of a differential 312. The differential case 310 is rotatably supported within a housing (not depicted) such as the axle housing, via a pair of bearings 314, 316. It should be appreciated that any type of bearing 314, 316 can be employed such as a needle bearing, a roller bearing, a tapered bearing, and the like, for example.

Figure 6:
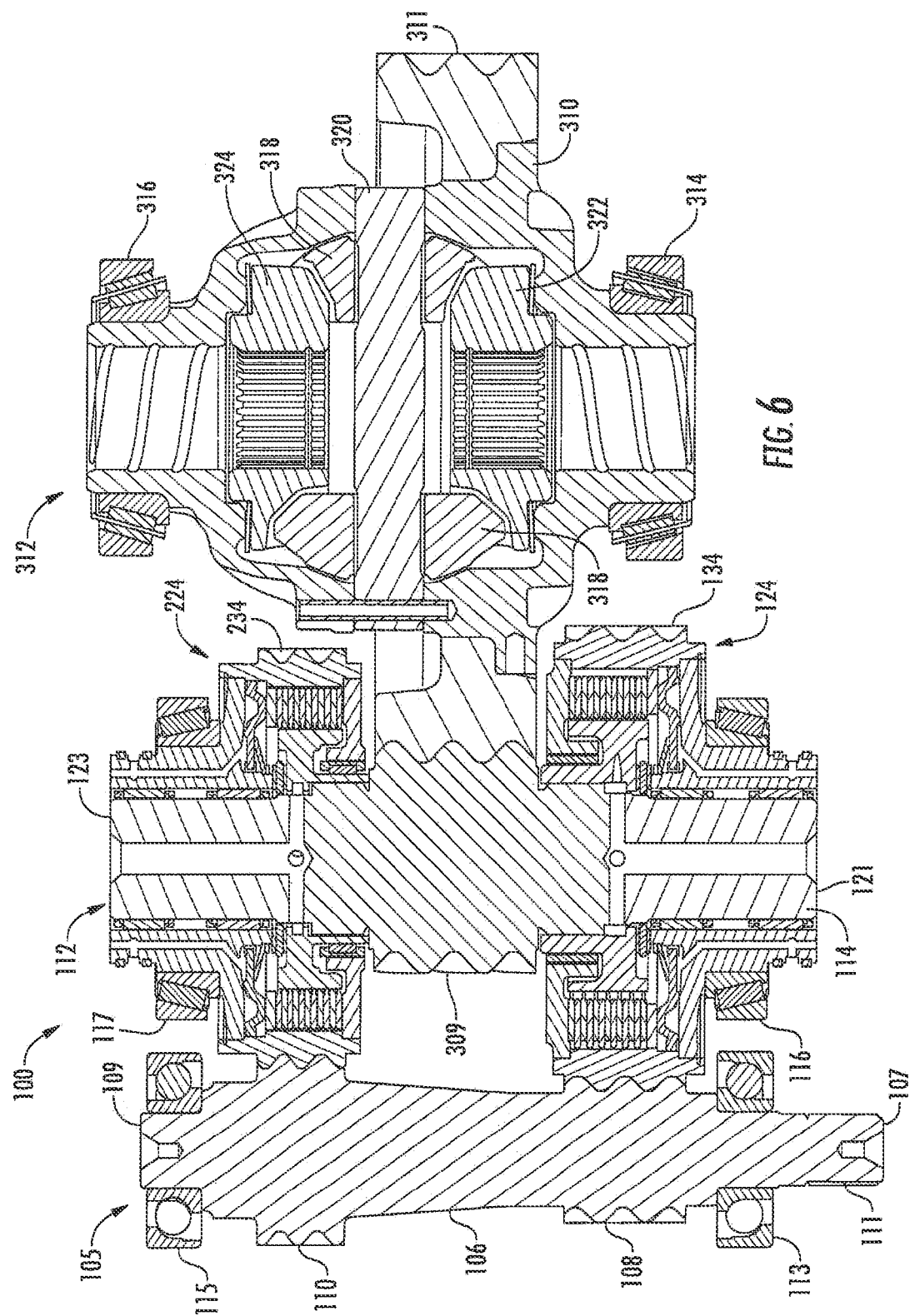
FIG. 6 is a cross-sectional view taken along section line A-A detailed in FIG. 5 of the portion of the electric drive axle shown in FIGS. 2-5.
Figure 7:
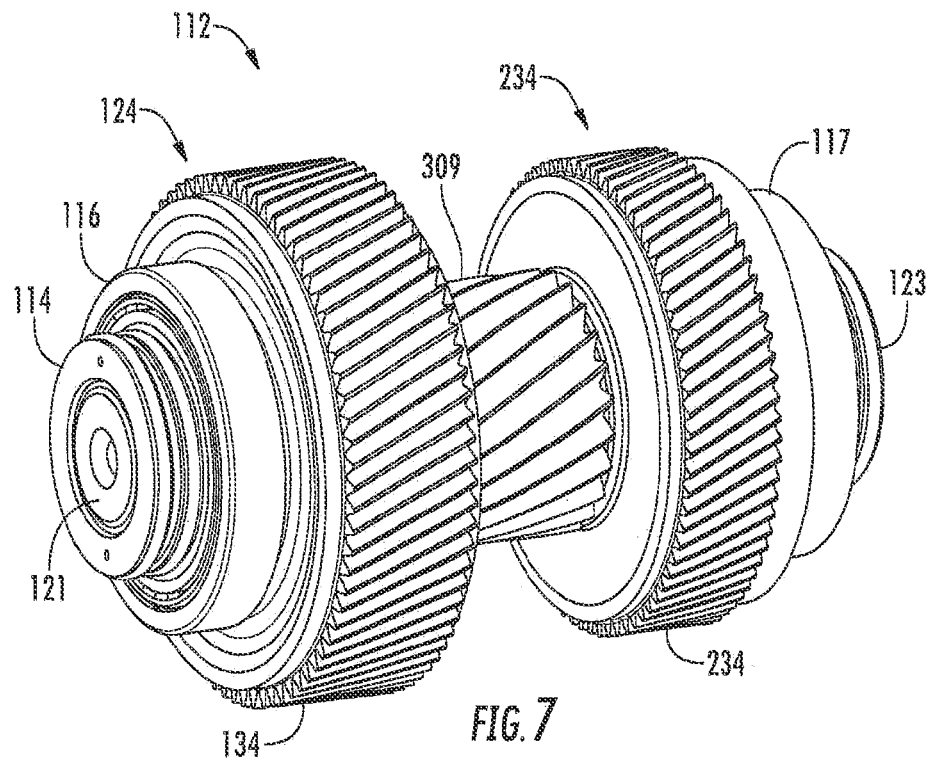
FIG. 7 is a side perspective view of the compound idler assembly shown in FIGS. 2-6.
Figure 8:
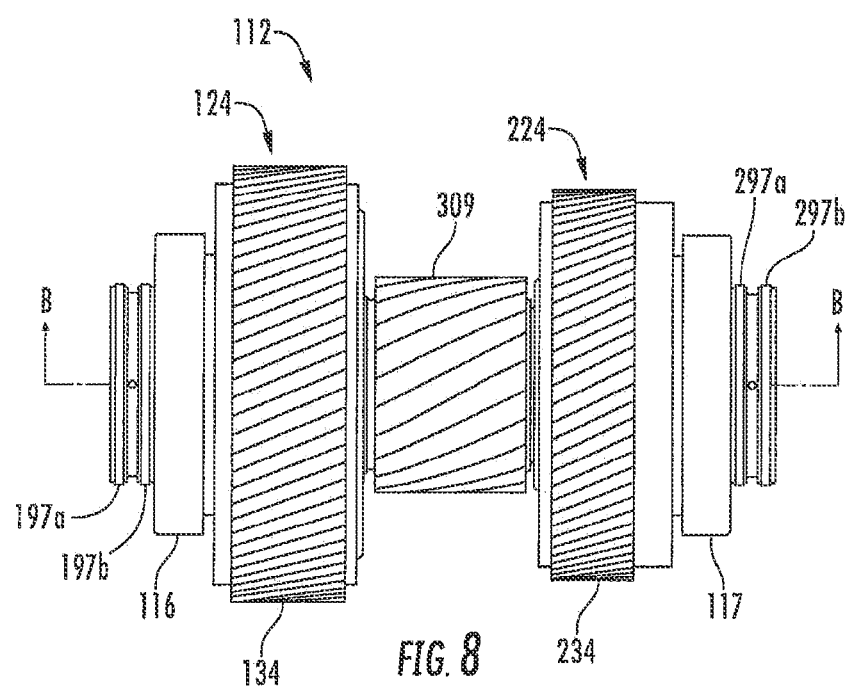
FIG. 8 is a side elevational view of the compound idler assembly shown in FIGS. 2-7.

As shown in FIG. 6, the differential 312 further includes two or more differential pinions 318. The differential pinions 318 are coupled within the differential case 310 via a pinion shaft 320 (i.e., spider shaft). In an embodiment, the pinion shaft 320 may comprise a cross member. The differential pinions 318 are in meshed engagement with a first side gear 322 and a second side gear 324. The first side gear 322 is coupled for rotation with the first axle shaft 16, and the second side gear 324 is coupled for rotation with the second axle shaft 18.

Additionally, the electric drive axle 100 may comprise a fluid actuator assembly (not depicted) such as a hydraulic actuator assembly, for example. The fluid actuator assembly can be in fluid communication with the second and third fluid sources and at least one of the first and second gear-clutch assemblies 124, 224. The fluid actuator assembly utilizes pressurized second and third fluid to actuate the first and second piston members 184, 284 and thereby engage the first and second gear-clutch assemblies 124,224, respectively.

In operation, when a first gear ratio is desired, the fluid actuator assembly is activated. The fluid actuator assembly causes the second fluid to flow from the second fluid source through the second fluid passage 196 into the chamber 199, thereby causing the piston member 184 of the first gear-clutch assembly 124 to be urged in the first axial direction. A movement of the piston member 184 in the first axial direction causes the first clutch 148 to engage, while the second clutch 248 of the second gear-clutch assembly 224 remains disengaged. When the first gear-clutch assembly 124 is engaged, the output shaft 106 of the electric motor 104 causes the first gear 108 couple9 thereto, to rotate therewith. A rotation of the first gear 108 drives the third gear 134, and causes the idler shaft 114 and the fifth gear 309 coupled thereto, to rotate therewith. A rotation of the fifth gear 309 drives the sixth gear 311, and causes the differential case 310 to rotate therewith. A rotation of the differential case 310 further causes the first and second half shafts 16, 18 to rotate therewith. The rotation of the differential case 310 transfers a desired torque from the output shaft 106 to the first and second axle shafts 16, 18. When the electric drive axle 100 is in a power generation mode, the torque transfer described above is reversed.

When operation of the vehicle 10 in the first gear ratio is no longer desired, an operation of the fluid actuator assembly is deactivated. Accordingly, the second fluid flows from the chamber 199 through the second fluid passage 196 and returns to the second fluid source. As the second fluid flows from the chamber 199, the biasing member 206 urges the piston member 184 of the first gear-clutch assembly 124 in the second axial direction. A movement of the piston member 184 in the second axial direction causes the first clutch 148 to disengage. As a result, the torque from the output shaft 106 is not transferred to the third gear 134 of the compound idler assembly 112.

When a second gear ratio, which is less than the first gear ratio, is desired, the fluid actuator assembly causes piston member 284 of the second gear-clutch assembly 224 to be urged in the first axial direction. A movement of the piston member 284 in the second axial direction causes the second clutch 248 to engage, while the first clutch 148 of the first gear-clutch assembly 124 remains disengaged. When the second gear-clutch assembly 224 is engaged, the output shaft 106 of the electric motor 104 causes the second gear 110 coupled thereto, to rotate therewith. A rotation of the second gear 110 drives the fourth gear 234, and causes the idler shaft 114 and the fifth gear 309 coupled thereto, to rotate therewith. A rotation of the fifth gear 309 drives the sixth gear 311, and causes the differential case 310 to rotate therewith. A rotation of the differential case 310 further causes the first and second half shafts 16, 18 to rotate therewith. The rotation of the differential case 310 transfers a desired torque from the output shaft 106 to the first and second axle shafts 16, 18. When the electric drive axle 100 is in a power generation mode, the torque transfer described above is reversed.

When operation of the vehicle 10 in the second gear ratio is no longer desired, an operation of the fluid actuator assembly is deactivated. Accordingly, the third fluid flows from the chamber 299 through the third fluid passage 296 and returns to the third fluid source. As the third fluid flows from the chamber 299, the biasing member 306 urges the piston member 284 of the second gear-clutch assembly 224 in the first axial direction. A movement of the piston member 284 in the first axial direction causes the second clutch 248 to disengage. As a result, the torque from the output shaft 106 is not transferred to the fourth gear 234 of the compound idler assembly 112.

Only one of the first and second gear-clutch assemblies 124,224 is engaged at one time during vehicle operation. However, in a parking brake mode, both the first and second gear-clutch assemblies 124, 224 may be engaged simultaneously. The first and second gear-clutch assemblies, 124, 224 also act as support members of the gear train.

It should be appreciated that various types of differentials may be employed for the differential 312 such as a locking differential and a torque vectoring dual clutch, for example.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

The invention claimed is:

1. A method of operating a gear-clutch assembly, comprising:
providing an idler assembly including a rotatable shaft having a first gear-clutch assembly selectively coupled to a first end thereof and a second gear-clutch assembly selectively coupled to a second end thereof;
providing a first fluid source in fluid communication with at least one of the first gear-clutch assembly and the second gear-clutch assembly through at least one fluid passage; and
selectively causing a first fluid to flow from the first fluid source to facilitate at least one of selective engagement and lubrication to at least one of the first and second gear-clutch assemblies,
wherein the at least one fluid passage comprises a first section extending radially outward to an outer peripheral surface of the rotatable shaft, and a second section fluidly connected to at least one aperture formed about a circumference of a clutch drum of the first gear-clutch assembly.

2. The method of claim 1, further comprising selectively causing a second fluid to flow from a second fluid source to facilitate at least one of selective engagement and lubrication to at least one of the first and second gear-clutch assemblies.

3. The method of claim 2, wherein the first fluid and the second fluid are different fluids.

4. The method of claim 2, wherein at least one of the first fluid and the second fluid contains oil.

5. The method of claim 1, wherein the rotatable shaft includes a gear that directly meshes with a gear in a differential.

6. The method of claim 1, wherein the gear that directly meshes with the differential gear is positioned axially between the first gear-clutch assembly and the second gear-clutch assembly.

7. The method of claim 1, the first gear-clutch assembly further includes a plurality of first clutch plates and a plurality of second clutch plates.

8. The method of claim 7, wherein the plurality of first clutch plates are in slidable engagement with a gear and the plurality of second clutch plates are in slidable engagement with a clutch drum.

9. A method of operating a gear-clutch assembly, comprising:
providing an idler assembly including a rotatable shaft having a first gear-clutch assembly selectively coupled to a first end thereof and a second gear-clutch assembly selectively coupled to a second end thereof;
providing a first fluid source in fluid communication with at least one of the first gear-clutch assembly and the second gear-clutch assembly through at least one fluid passage; and
selectively causing a first fluid to flow from the first fluid source to facilitate at least one of selective engagement and lubrication to at least one of the first and second gear-clutch assemblies, wherein:
the idler assembly is drivingly coupled to an electric motor;
the first gear-clutch assembly includes a gear having a clutch at least partially disposed therein;
the clutch includes a clutch drum disposed at least partially concentrically within the gear; and
the clutch drum includes at least one aperture formed therein which is in fluid communication with the at least one fluid passage.

10. The method of claim 9, wherein the electric motor is positioned parallel to a differential.

* * * * *